United States Patent [19]

Yamamoto et al.

[11] Patent Number: 5,225,496
[45] Date of Patent: Jul. 6, 1993

[54] METHACRYLIMIDE GROUP-CONTAINING POLYMER

[75] Inventors: Naoki Yamamoto; Masaharu Fujimoto; Hideyuki Fujii, all of Otake, Japan

[73] Assignee: Mitsubishi Rayon Company Ltd., Tokyo, Japan

[21] Appl. No.: 834,203

[22] Filed: Feb. 12, 1992

[30] Foreign Application Priority Data

Mar. 11, 1991 [JP] Japan .................... 3-044955

[51] Int. Cl.$^5$ .............................................. C08F 8/32
[52] U.S. Cl. ........................... 525/330.5; 525/378; 525/379; 525/328.2; 525/329.4; 525/329.5; 525/329.9
[58] Field of Search .............. 525/330.5, 329.9, 329.5, 525/329.4, 328.2, 378, 379

[56] References Cited

U.S. PATENT DOCUMENTS

| | | | |
|---|---|---|---|
| 4,169,924 | 10/1979 | Barabas et al. | 525/377 |
| 4,246,374 | 1/1981 | Kopchik | 525/329 |
| 4,954,574 | 9/1990 | Hallden-Abberton et al. | 525/327.6 |
| 5,023,302 | 6/1991 | Anzai et al. | 525/378 |
| 5,096,968 | 3/1992 | Nishida et al. | 525/526 |
| 5,110,877 | 5/1992 | Hoess et al. | 525/378 |

FOREIGN PATENT DOCUMENTS

| | | |
|---|---|---|
| 0216505 | 4/1987 | European Pat. Off. |
| 0358093 | 3/1990 | European Pat. Off. |
| 0376747 | 7/1990 | European Pat. Off. |
| 2393818 | 1/1979 | France |

*Primary Examiner*—Joseph L. Schofer
*Assistant Examiner*—M. Nagumo
*Attorney, Agent, or Firm*—Oblon, Spivak, McClelland, Maier & Neustadt

[57] ABSTRACT

A methacrylimide group-containing polymer containing repeating units represented by the following general formulas, respectively.

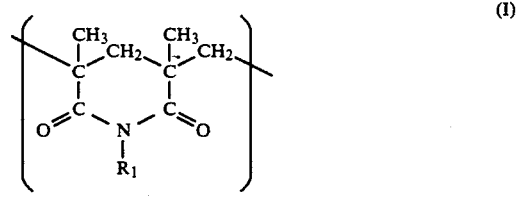

(I)

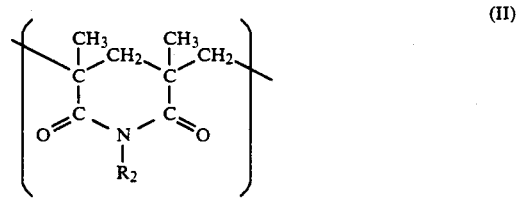

(II)

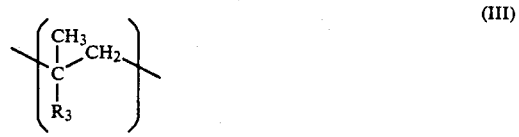

(III)

wherein $R_1$, $R_2$ and $R_3$ are preferably methyl, butyl and methyl ester group, respectively.

5 Claims, 1 Drawing Sheet

METHACRYLIMIDE GROUP-CONTAINING POLYMER

BACKGROUND OF THE INVENTION

1. Field of the Invention

The present invention relates to a methacrylimide group-containing polymer having an excellent heat resistance, fabricability, and thermal stability, and an excellent balance of these physical properties.

2. Discussion of Background

Methyl methacrylate polymers are widely used, due to their excellent transparency, weather resistance and mechanical properties, in various fields of industry such as the automobile, electrical or electronic industry, and building material. However, since the thermal deformation temperature of a methyl methacrylate polymer is as low as about 100° C., it is difficult to use this polymer in an atmosphere at a temperature higher than 100° C. On the other hand, a polycarbonate has been used as a resin with a transparency and heat resistance. However, the temperature under which the polycarbonate is practically resistant is lower than 140° C. Therefore, the polycarbonate is not always satisfactory according to its application.

As processes for improving the heat resistance of a methyl methacrylate polymer, there is known a process for imidizing the methyl methacrylate polymer by utilizing the side chain reaction of methyl methacrylate polymer. As the process for the imidization of a methyl methacrylate polymer, there have been proposed a process for subjecting a methyl methacrylate polymer to a thermal decomposition condensation reaction with a primary amine as disclosed in U.S. Pat. No. 2,146,209, a process for reacting a methyl methacrylate polymer with a water-soluble ammonium salt or water-soluble N-alkyl ammonium salt as disclosed in U.S. Pat. No. 3,244,679, and a process for reacting a methyl methacrylate polymer with ammonia or a primary amine in an extruder as disclosed in U.S. Pat. No. 4,246,374.

In these former processes, however, most of the imidizations are carried out by using a single imidizing agent, and thus, the imidized polymers have only one kind of methacrylimide structure. Accordingly, the polymer which is imidized with methylamine or ammonia has a low fluidity and the fabricability thereof is very poor.

On the other hand, the polymer with a low methacrylimide group content in which imidization degree is lowered to improve the fluidity has a defect that the thermal stability is low and the polymer will decompose in a high temperature atmosphere since the units of methacrylic ester and its residual derivatives remain or exist in the polymer. Thus, the polymer is not satisfactory in practical use as a heat resistant molding material.

Further, while Example 44 of the U.S. Pat. No. 4,246,374 discloses the use of a mixture of 5% ammonium and 95% butylamine as the imidizing agent, there is no specific description or suggestion of what proportion of the repeating units of methacrylimide groups and butyl methacrylimide groups formed by such imidizing agents gives the polymer an excellent heat resistance, fabricability, and thermal stability, and a good balance of these physical properties.

SUMMARY OF THE INVENTION

In consideration of the prior art explained above, close investigation has been made for obtaining a methacrylimide group-containing polymer having a good heat resistance and fabricability, particularly and excellent fluidity and thermal stability, and an excellent balance of these physical properties. As a result of the investigation, it has been found that the object can be achieved by forming a polymer with at least 2 kinds of different methacrylimide structural units in specific contents, respectively.

The present invention relates to a methacrylimide group-containing polymer containing the repeating units represented by the following general formulas (I), (II), and (III), respectively, the contents of the repeating unit represented by the general formula (I), that of the repeating unit represented by the general formula (II), and that of the repeating unit represented by the general formula (III) being 30 to 98% by weight, 2 to 70% by weight, and 0 to 20% by weight, respectively, based on the weight of the polymer.

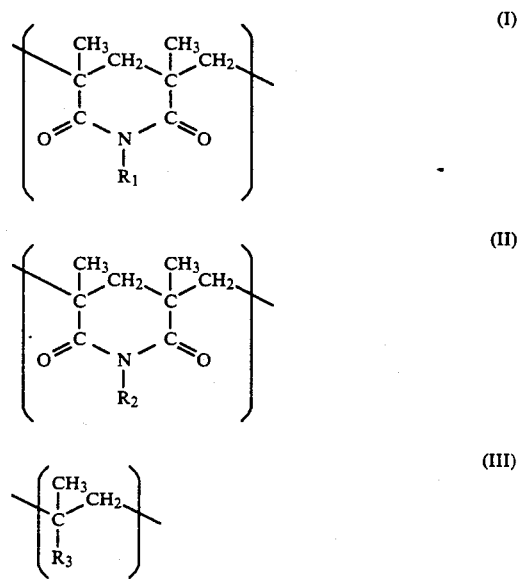

In the above formulas (I), (II) and (III), $R_1$ and $R_2$ are different from each other, and represent a hydrogen atom, or an aliphatic, aromatic, or alicyclic hydrocarbon radical with 1 to 18 carbon atoms, respectively, and $R_3$ represents a member selected from the group consisting of carboxyl group, an aliphatic ester group with 1 to 6 carbon atoms, and aliphatic, aromatic or alicyclic amide group with 1 to 18 carbon atoms.

DETAILED DESCRIPTION OF THE INVENTION

Figure 1:
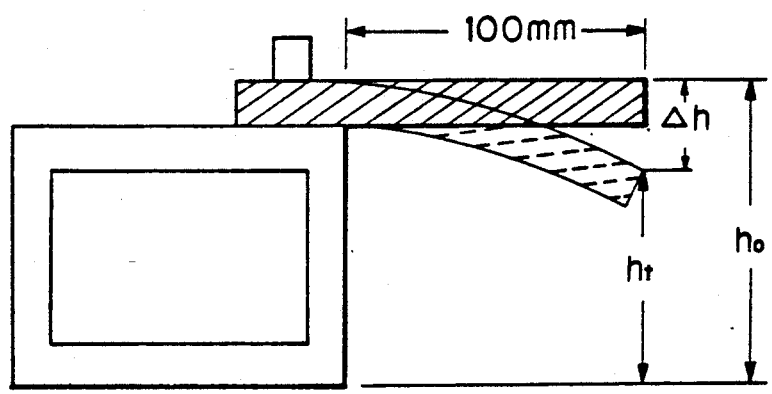
FIG. 1 illustrates the fixture used in the heat resistance test in the Examples and Comparative Examples and shows how the resistance is determined.

The most important feature of the present invention is that, unlike methacrylimide group-containing polymers having a single kind of methacrylimide structural unit proposed in the past, the methacrylimide group-containing polymer of the present invention has excellent physical properties such as heat resistance, fabricability, and thermal stability, and a good balance of these physical properties, due to the fact that the present polymer contains at least two different kinds of methacrylimide structural units (I) and (II) as indispensable repeating units, in specific contents, respectively.

As the substituents $R_1$, $R_2$ and $R_3$ in the repeating units (I), (II) and (III), there may be mentioned the substituents selected from a hydrogen atom, and aliphatic, aromatic or alicyclic hydrocarbon radicals with 1 to 18 carbon atoms, with the condition that $R_1$ and $R_2$ are different from each other.

Further, in consideration of the heat resistance of the methacrylimide group-containing polymer of the present invention, $R_1$ in the general formula (I) is preferably selected from a hydrogen atom, and methyl, ethyl, propyl, or cyclohexyl groups, and in this case, $R_2$ is preferably selected from other alkyl groups with 3 to 18 carbon atoms. A combination of $R_1$ in the general formula (I) and $R_2$ in the general formula (II), in which $R_1$ is a phenyl group and $R_2$ is a butyl group, is particularly preferable.

In this specification, the repeating unit having a methacrylimide structure and the substituent which forms a harder segment in a polymer is assumed to be the repeating unit (1), and thus, the repeating unit having another methacrylimide structure and containing the substituent which forms a softer segment in a polymer is assumed to be the repeating unit (2).

The contents of the repeating units (I) and (II) are preferably within the ranges of from 30 to 98% by weight and from 2 to 70% by weight, respectively, and the total amount of the repeating units (I) and (II) are preferably within the range of from 90 to 100% by weight. When the above total amount is smaller than 90% by weight, it is difficult to obtain a practically satisfactory heat resistance and thermal stability.

The repeating unit (I) contributes greatly to the heat resistance of the methacrylimide group-containing polymer as compared with the repeating unit (II). When the content of this repeating unit (I) is less than 30% by weight, it becomes difficult for this unit to contribute to the improvement of heat resistance. When this content exceeds 98% by weight, the content of another repeating unit (II) reaches zero or substantially zero, and the methacrylimide group-containing polymer has a poor melt fluidity, although having an excellent heat resistance.

The substituent $R_3$ constituting the repeating unit (III) is the residue of the unreacted unit or intermediate unit produced when obtaining the methacrylimide group-containing polymer, and the lower the content of the repeating unit (III), the higher the thermal stability of the obtained polymer. This $R_3$ substituent is actually a carboxyl group, an aliphatic ester group with 1 to 6 carbon atoms or one kind of group selected from aliphatic, aromatic and alicyclic amide groups with 1 to 18 carbon atoms which amide groups correspond to $R_1$ and $R_2$ of the general formulas (I) and (II), respectively. Of these groups, carboxyl group and aliphatic ester group with 1 to 6 carbon atoms are preferable. Further, the repeating unit (III) may contain two or more different $R_3$ groups simultaneously.

The content of the repeating unit (III) of the methacrylimide group-containing polymer of the present invention is from 0 to 20% by weight, preferably 5% by weight or less, and more preferably 2% by weight or less. When this content exceeds 20% by weight, a disadvantage arises in that the thermal stability of the methacrylimide group-containing polymer is lowered and the molding temperature range is narrowed when the polymer is used as molding material.

The methacrylimide group-containing polymer of the present invention preferably has a melt index (measured under the conditions: 265° C./10 kg load) of 1.5 g/10 min or more. When the melt index is below 1.5 g/10 min, a sufficient fluidity may not be obtained when the polymer is used as injection molding material.

A specific example for producing the methacrylimide group-containing polymer according to the present invention is explained as follows:

A methyl methacrylate polymer and a compound represented by the formula (IV)

$$R_2-NH_2 \qquad (IV)$$

wherein $R_2$ represents a hydrogen atom, or aliphatic, aromatic or alicyclic hydrocarbon radical with 1 to 18 carbon atoms, for example, n-butylamine are allowed to react in the presence of a solvent mixture of toluene/methanol at a temperature of from 100° to 350° C. and in the presence of an inactive gas. To the reaction product thus obtained, there is added a compound represented by the following formula

$$R_1-NH_2 \qquad (V)$$

wherein $R_1$ is a hydrogen atom, or an aliphatic, aromatic or alicyclic hydrocarbon radical with 1 to 18 carbon atoms, and $R_1$ is different from $R_2$, for example, methylamine, and these substances are again allowed to react at a temperature ranging from 100° to 350° C. in the presence of an inactive gas such as nitrogen gas, following which volatile substances and/or unreacted imidizing agent, for example methyl amine is separated from the reaction product freshly obtained, so that a methacrylimide group-containing polymer containing 2 different kinds of methacrylimides such as the repeating units (I) and (II), e.g., N-methyl methacrylimide and N-butyl methacrylimide is produced. The methacrylimide group-containing polymer thus produced displays an excellent thermal stability, heat resistance, and transparency.

Alternatively, there may be adopted, as occasion demands, a process in which the different imidizing agents are simultaneously reacted with a methyl methacrylate polymer to prepare an imidized polymer.

The starting polymer for obtaining this methacrylimide group-containing polymer may include a methyl methacrylate polymer, methacrylic acid polymer, copolymers of methyl methacrylate or methacrylic acid with another vinyl monomer copolymerizable therewith and polymer blend thereof. Further, if the intrinsic viscosity of these starting polymers is too low, the mechanical strengths of the methacrylimide group-containing polymers to be obtained are low even though they have an excellent fluidity, and it becomes difficult to obtain good methacrylimide group-containing polymers for molding. Therefore, it is preferable to use a starting polymer with an intrinsic viscosity of 0.25 or more, preferably 0.3 or more. The vinyl monomer copolymerizable with methyl methacrylate or methacrylic acid includes styrene, a styrene derivative such as chlorostyrene, an olefin such as ethylene and propylene, a vinyl cyanide derivative such as acrylonitrile, a vinyl halide such as vinyl chloride, a vinylidene halide such as vinylidene chloride. These vinyl monomers give further additional functions (e.g., chemicals resistance, ozone resistance, flame retardance, fluidity, film-forming properties, etc.) to the methacrylimide group-containing polymer. The content of the unit derived from the copolymerizable vinyl monomer is preferably from 0 to 5% by weight combined with the content of the repeating unit represented by the above formula (III). When the above content exceeds 5% by weight, the thermal stability of the methacrylimide group-containing polymer is lowered.

The methacrylimide group-containing polymer of the present invention can be used as such as a raw material for various fabrications such as injection molding, press molding, and extrusion molding. Furthermore, the present methacrylimide group-containing polymer may be blended with one or more other resins, e.g., ABS resin, a polyester resin such as polybutylene terephthalate, a polyamide resin such as 6-Nylon and 4,6-Nylon to improve the impact resistance, chemicals resistance, and heat resistance thereof. Also, fillers such as glass fibers, carbon fibers, talcs and calcium carbonate powders may be compounded into the methacrylimide group-containing polymer. Other additives such as a lubricant, releasing agent, thermal stabilizer, flame retardant, coloring agent, and ultraviolet absorber may also be blended with the methacrylimide group-containing polymer with the condition that the additive will not inhibit the properties of the polymer.

The methacrylimide group-containing polymer of the present invention is formed into desired molded articles by subjecting it to various molding methods such as injection molding, extrusion molding, press molding, blow molding, and calender molding, and may be used for the application in which the excellent heat resistance and mechanical properties of this polymer can be efficiently utilized. Especially, due to the characteristics of the polymer, which have an excellent melt fluidity and thermal stability, the molding of the polymer may be advantageously carried out in terms of the ranges of the processing conditions at the time of fabrication of the polymer, e.g., the size and shape of a molded article, or molding temperature and molding cycle.

EXAMPLES

Now, the present invention will be explained in further detail with reference to Examples. However, it should be understood that the present invention is by no means restricted by such specific Examples.

In the Examples, "parts" indicates parts by weight. The methods of measuring the various physical properties in the Examples are as described below:

1) Melt index:
Melt index was determined according to ASTM D-1238. The measurement was carried out at a barrel temperature of 265° C. and an extrusion load of 10 kg weight.

2) Thermal stability test:
Using a press molding machine, a polymer sample was inserted between two press plates heated to a temperatures of 330° C. and 350° C., respectively, and kept for 30 min in the pressurized state. Subsequently, this sample was cooled to an ambient temperature together with the press plates, the pressed sample was taken out, and it was visually observed whether or not foaming had occurred in the plate thus obtained.

3) Heat resistance test (heat sag test):
The test piece (150 mm in length, 10 mm in width, and 4 mm in thickness) prepared in 2) above was fixed at one end to a fixture (made of stainless steel) as shown in FIG. 1 with a clamp in such a way that the overhang was 100 mm. The height $h_0$ of the test piece from a reference plane was measured with a height gauge. Subsequently, the atmospheric temperature was elevated to 140° C., and the test piece was kept at this temperature for 1 hour, and then the height $h_t$ of the test piece from the reference plane was again measured. From the data thus obtained, the magnitude of the sagging of the test piece, i.e., the height difference before and after the heating of the test piece, is calculated according to the following equation:

$$\Delta h = h_0 - h_t$$

The larger the value of $\Delta h$, the lower the heat resistance of the test piece.

4) IR spectra:
Using an IR spectrometer, IR spectra was measured within the range of from 800 $cm^{-1}$ to 4000 $cm^{-1}$ according to the KBr method.

5) Elemental analysis:
The nitrogen atom content (% by weight) of each polymer was determined with a CHN coder.

6) Injection molding:
A resin polymer sample was granulated (pelletized) by a devolatilization type extruder under a heated condition, and the granulated sample was formed into a box-shaped molded article (top plate: 150 mm in length, 120 mm in width, and 2.5 mm in thickness; side plate: 50 mm in width and 2.0 mm in thickness) using an injection molding machine (IS-100 EN made by Toshiba Machine Co., Ltd.). The injection molding was conducted under the following conditions: set cylinder temperature of 310° C., mold heating medium temperature of 80° C., and set injection rate of 90%.

EXAMPLE 1

In a reactor having an internal volume of 1.5 l and equipped with a reagent injection vessel and jacket heater, were introduced 100 parts of a methyl methacrylate polymer (intrinsic viscosity 0.32), 150 parts of toluene, 70 parts of methanol, and 3 parts of n-butylamine, the air in the reactor was purged with nitrogen, and then the contents of the reactor were heated to 230° C. while being stirred to dissolve the polymer. Then, the contents were allowed to react for 1 hour at a temperature of 230° C., and after the reaction was completed (completion of the first stage reaction), extremely small quantities of the reactants were taken out. Subsequently, a 50% methanol solution containing 30 parts by weight of methyl amine was added to the reactor from the reagent injection vessel, and thereafter, the contents were allowed to react for 2 hours at a temperature of 230° C. After the reaction was completed (completion of the second stage reaction), the reaction product was recovered and purified to obtain white powdered polymers.

The polymers thus obtained were extruded by a devolatilization type shaping device at a barrel temperature of from 280° C. to 320° C. to obtain a transparent strand-shaped polymer. As the result of an analysis of the purified and dried product of the extremely, small quantity of the sample recovered at the completion of the first stage reaction by the IR spectra measurement and elemental analysis, it was confirmed that an absorption attributable to an imide structure existed, but it was not confirmed that any absorption attributable to an amide group existed. Further, it was found from the elemental analysis that this sample contained about 5% by weight of the structural unit of n-butyl methacrylimide.

Similarly, with regard to the strand-shaped polymer of the white powdered polymer obtained after the completion of the second stage reaction, it was confirmed by a FT-IR absorption spectrum that an absorption attributable to an imide structure existed. Further, it was found from the elemental analysis that the polymer contained about 95% by weight of the structural unit of N-methyl methacrylimide and about 5% by weight of the structural unit of N-butyl methacrylimide. The melt index of the strand-shaped polymer obtained was 2.5 g/10 min. Also, when this polymer was subjected to the thermal stability test by a press molding machine mentioned above, foaming did not occur even at temperatures of 330° C. or 350° C.

Further, when the test piece obtained by the press molding was subjected to the heat sag test mentioned above, the magnitude of sagging was 0 mm at a temperature of 140° C. after 1 hour. The reaction conditions, results of the composition analysis of chemical composition of the polymer, and the test results mentioned above are summarized in Table 1.

Further, Example 1 was repeated several times to obtain about 800 g of the reaction product. The reaction product thus obtained was extruded into a strand-shaped polymer by a devolatilization type screw extruder comprising a barrel, a screw, vents and a die, and the polymer obtained was shaped into pellets (granular polymers) by a cutter.

When the pellets thus obtained were formed into a box-shaped molded article by the injection machine mentioned above at a cylinder temperature of 310° C., a mold heating medium temperature of 80° C., and an injection rate of 90%, a good molded article was obtained under an injection pressure of 50%.

EXAMPLES 2 to 4

The same procedure as in Example 1 was conducted except that the kinds of amines used as imidizing agent were varied as set forth in Table 1. The reaction conditions, results of the composition analysis, and test results in Examples 2 to 4 are summarized in Table 1.

EXAMPLE 5

In a reactor with an internal volume of 1.5 l and equipped with a reagent injection vessel and jacket heater were introduced 100 parts of a methyl methacrylate polymer (intrinsic viscosity 0.32), 150 parts of toluene, 70 parts of methanol, 200 parts of aniline and 50 parts of n-butylamine, the air in the reactor was purged with nitrogen, and then the contents of the reactor were heated to 230° C. while being stirred to dissolve the polymer, and the contents were allowed to react for 2 hours at a temperature of 250° C. After the reaction was completed, the reaction product was recovered and purified to obtain white powdered polymers.

The polymers thus obtained were extruded at a barrel temperature of from 280° C. to 320° C. by a devolatilization type shaping device comprising a barrel, piston and die to obtain a transparent strand-shaped polymer. By subjecting the polymer thus obtained to the IR spectrum measurement, a methacrylimide structure was identified. Also, it was found by the elemental analysis that this polymer contained 55% by weight of an N-phenyl methacrylimide structure and 45% by weight of an N-butyl methacrylimide structure. The melt index of the strand-shaped polymer was 10 g/10 min.

Further, when the above polymer was subjected to the thermal stability test by a press molding machine, foaming did not occur even at temperatures of 330° C. or 350° C.

Furthermore, when the test piece obtained by the press molding of the polymer mentioned above was subjected to the heat sag test, the magnitude of sagging was 0 mm at a temperature of 140° C. after 1 hour. The reaction conditions, results of the composition analysis, and test results in Example 5 are summarized in Table 1.

COMPARATIVE EXAMPLE 1

In a reactor with an internal volume of 1.5 l and equipped with a reagent introducing vessel and jacket heater were introduced 100 parts of a methyl methacrylate polymer (intrinsic viscosity 0.32), 150 parts of toluene, and 70 parts of methanol, the air in the reactor was purged with nitrogen, and then the contents of the reactor were heated up to 230° C. while being stirred to dissolve the polymer. Subsequently, at a temperature of 230° C., a 50% methanol solution containing 30 parts by weight of methylamine was added to the reactor from the reagent injection vessel, and thereafter the contents of the reactor were allowed to react for 2 hours at a temperature of 230° C. After the reaction was completed, the reaction product was recovered and purified to obtain white powdered polymers.

The polymers thus obtained were extruded at a barrel temperature of from 280° C. to 320° C. by a devolatilization type shaping device comprising a barrel, piston and die to obtain a transparent strand-shaped polymer. By subjecting this polymer to the IR spectrum measurement, a methacrylimide structure was identified. Also, it was found by the elemental analysis that this polymer contained about 100% by weight of the structural unit of N-methyl methacrylimide. The melt index of the polymer obtained was 1.3 g/10 min.

Further, when this polymer was subjected to the thermal stability test by the press molding machine, no foaming occurred even at temperatures of 330° C. or 350° C. Furthermore, when the test piece obtained by the press molding of the polymer was subjected to the heat sag test, the magnitude of sagging was 0 mm at a temperature of 140° C. after 1 hour.

The reaction conditions, results of the composition analysis, and test results in Comparative Example 1 are summarized in Table 1.

COMPARATIVE EXAMPLES 2 AND 3

Comparative Example 1 was repeated except that the kind and amount introduced of the amine used as imidizing agent were varied as set forth in Table 1.

Also, Comparative Example 1 was repeated several times to obtain about 800 g of a reaction product. This reaction product was extruded into strand-shaped polymer by a devolatilization type screw extruder comprising a barrel, a screw, vents, and a die, and the strand-shaped polymer was shaped into pellets by a cutter.

When the pellets thus obtained were molded into a box-shaped article by the injection molding machine at a set cylinder temperature of 310° C., a mold heating medium temperature of 80° C. and a set injection rate of 90%, the resin was not sufficiently filled under an injection pressure of 50%. Even when the injection pressure was elevated to 95%, a completely filled form could not be obtained.

The reaction conditions, results of the composition analysis, and test results in Comparative Examples are summarized in Table 1.

COMPARATIVE EXAMPLE 4

In a reactor with an internal volume of 1.5 l and equipped with a reagent injection vessel and a jacket heater were introduced 100 parts of a methyl methacrylate polymer (intrinsic viscosity 0.18), 150 parts of toluene and 70 parts of methanol, and the air in the reactor was purged with nitrogen, and thereafter, the contents of the reactor were heated to 230° C. while being stirred to dissolve the polymer. Subsequently, a 50% methanol solution containing 30 parts by weight of methylamine was added to the reactor from the reagent injection vessel, and then the contents of the reactor were allowed to react for 2 hours at a temperature of 230° C. After the reaction was completed, the reaction product was recovered and purified to obtain white powdered polymers.

The polymers thus obtained were extruded at a barrel temperature of from 280° C. to 320° C. by a devolatilization type shaping device comprising a barrel, piston and die to obtain a transparent strand-shaped polymer. By subjecting this polymer to the IR spectrum measurement, a methacrylimide structure was identified. Also, it was found by the elemental analysis that this polymer contained about 100% by weight of the structural unit of methyl methacrylimide. The melt index of the obtained polymer was 2.2 g/10 min.

Further, when this polymer was subjected to the thermal stability test by the press molding machine at a molding temperatures of 330° C. or 350° C., it was broken due to an insufficient strength of the polymer when released from the mold. Thus, the molding was impossible. Therefore, it was not possible to observe whether or not foaming occurred, or to assess the heat resistance of the polymer according to the heat sag test.

The reaction conditions, results of the composition analyses, and test results in Comparative Example 4 are summarized in Table 1.

The tests results for a polycarbonate (PC) (commercially available product) and a methyl methacrylate polymer (PMMA) (commercially available product), which were carried out under the same conditions as the foregoing Examples and Comparative Examples, are also set forth in Table 1.

The following become apparent from Table 1:

1) The methacrylimide group-containing polymers obtained in Examples 1 to 5 have an excellent balance of fluidity, thermal stability and heat resistance.
2) This excellent balance of the performances explained in 1) above is obtained due to the existence of two different kinds of methacrylimide structures in the methacrylimide group-containing polymer. On the other hand, the polymer obtained in Comparative Example 1 which contains 100% by weight of methyl methacrylimide structure has a considerably low fluidity, although it has an excellent thermal stability and heat resistance.
3) Also, the polymer having a reduced methyl methacrylimide content has a considerably low thermal stability and heat resistance, although it has an improved fluidity, as described in Comparative Example 2.
4) The polymer containing 100% by weight of an n-butyl methacrylimide structures has an extremely low heat resistance, although it has a good fluidity and thermal stability, as described in Comparative Example 3.
5) When a methyl methacrylate polymer with a low intrinsic viscosity is used as a starting material, as in Comparative Example 4, although the fluidity of the methacrylimide group-containing polymer is improved, its mechanical strength is considerably lowered, and thus, such imidized polymer can not be used as a molding material.
6) The methacrylimide group-containing polymer of the present invention is distinguished by an excellent balance of the heat resistance, thermal stability and fluidity, compared with other transparent resin materials such as polycarbonates and methyl methacrylate polymers.

TABLE 1

| | | Example 1 | Example 2 | Example 3 | Example 4 | Example 5 |
|---|---|---|---|---|---|---|
| Supplied Starting Material parts by weight based on 100 parts by weight of PMMA | Imidizing agent (V) | methylamine 30 | methylamine 30 | methylamine 23 | methylamine 30 | aniline 200 |
| | Imidizing agent (IV) | n-butylamine 3 | n-dodecylamine 7 | n-butylamine 3 | n-butylamine 5 | n-butylamine 50 |
| | PMMA (η) | 0.32 | 0.32 | 0.32 | 0.32 | 0.32 |
| Chemical Composition of Copolymer (% by weight) | Substituent $R_1$ | methyl 95 | methyl 90 | methyl 90 | methyl 90 | phenyl 55 |
| | Substituent $R_2$ | n-butyl 5 | n-dodecyl 6 | n-butyl 6 | n-butyl 10 | n-butyl 45 |
| | Substituent $R_3$ | 0 | 4 | 4 | 0 | 0 |
| Melt Index (g/10 min) | | 2.5 | 3.5 | 3.2 | 3.1 | >10 |
| Foaming in Press Molded Plate | 330° C. | no | no | no | no | no |
| | 350° C. | no | no | no | no | no |
| Heat Sag Magnitude (mm) | | 0 | 1 | 0 | 1 | 0 |
| Remarks | | Compara. Example | Compara. Example | Compara. Example | Compara. Example | Compara. Example | Compara. Example |

TABLE 1-continued

|  |  | 1 | 2 | 3 | 4 | (PC) | (PMMA) |
|---|---|---|---|---|---|---|---|
| Introduced Starting Material parts by weight based on PMMA | Imidizing agent (V) | methyl-amine 30 | methyl-amine 18 | n-butyl-amine 70 | methyl-amine 30 | — | — |
|  | Imidizing agent (IV) | — | — | — | — | — | — |
|  | PMMA ($\eta$) | 0.32 | 0.32 | 0.32 | 0.18 | — | — |
| Chemical Composition of Copolymer (% by weight) | Substituent $R_1$ | methyl | methyl | n-butyl | methyl | — | — |
|  | Subsitituent $R_2$ | — | — | — | — | — | — |
|  | Substituent $R_3$ | 0 | 30 | 0 | 0 | — | — |
| Melt Index (g/10 min) |  | 1.3 | 6.0 | >10 | 2.2 | 4.0 | >10 |
| Foaming in Press Molded Plate | 330° C. | no | yes | no | x | no | x |
|  | 350° C. | no | yes | no | x | yes | x |
| Heat Sag Magnitude (mm) |  | 0 | 15 | x | — | 7 | — |
| Remarks |  |  |  | undeterminable due to large degree of deformation | unmoldable due to insufficient strength of molded product |  | unmoldable due to considerable degree of foaming |

What is claimed is:

1. A methacrylimide group-containing polymer containing repeating units represented by the following general formulas (I), (II) and (III), respectively,

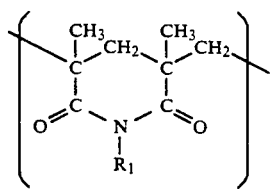
(I)

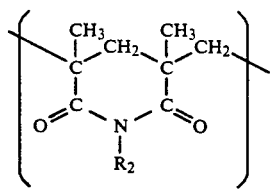
(II)

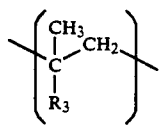
(III)

the contents of the repeating units represented by the general formulas (I), (II), and (III) in said polymer being 30 to 98% by weight, 2 to 70% by weight, and 0 to 20% by weight, respectively, based on the weight of said polymer wherein $R_1$ and $R_2$ are different from each other,
and in which $R_1$ in the general formula (I) is a substituent selected from the group consisting of a hydrogen atom, cyclohexyl group, phenyl group and alkyl groups with 1 to 3 carbon atoms,
and $R_2$ is another substituent selected from alkyl groups with 3 to 18 carbon atoms
and $R_3$ represents a member selected from the group consisting of carboxyl group, an aliphatic ester group with 1 to 6 carbon atoms, and an aliphatic, aromatic or alicyclic amide group with 1 to 18 carbon atoms.

2. The methacrylimide group-containing polymer according to claim 1, in which $R_1$ in the general formula (I) is a phenyl group, and $R_2$ in the general formula (II) is a butyl group.

3. The methacrylimide group-containing polymer according to claim 1, in which the total amount of the repeating unit represented by the general formula (I) and the repeating unit represented by the general formula (I) and the repeating unit represented by the general formula (II) is from 90 to 100% by weight.

4. The methacrylimide group-containing polymer according to claim 1, in which $R_3$ in the general formula (III) is a member selected from the group consisting of carboxyl group and an aliphatic ester group with carbon atoms 1 to 6.

5. The methacrylimide group-containing polymer according to claim 1, in which a melt index measured according to ASTM D 1238 (at a temperature of 265° C., and under a load of 10 kg) of said polymer is at least 1.5 g/10 min.

* * * * *